(12) United States Patent
Hutton et al.

(10) Patent No.: US 6,684,908 B1
(45) Date of Patent: Feb. 3, 2004

(54) SELF-LOCKING, HIGH PRESSURE SERVICE STOPPER

(75) Inventors: William Michael Hutton, Nazareth, PA (US); Jeffrey Clinton Bond, Blakeslee, PA (US); Michael David Ahner, Saylorsburg, PA (US)

(73) Assignee: Omega Tools, Inc., Mt. Bethel, PA (US)

( * ) Notice: Subject to any disclaimer, the term of this patent is extended or adjusted under 35 U.S.C. 154(b) by 0 days.

(21) Appl. No.: 10/267,816

(22) Filed: Oct. 9, 2002

(51) Int. Cl.[7] ................................................. F16L 55/10
(52) U.S. Cl. ............................... 138/89; 138/90; 138/97
(58) Field of Search .................................. 138/89, 90, 97

(56) References Cited

U.S. PATENT DOCUMENTS

| | | | | |
|---|---|---|---|---|
| 3,161,037 A | * | 12/1964 | Lagerquist .................... 70/169 |
| 3,353,566 A | * | 11/1967 | Cepkauskas et al. ........ 376/203 |
| 3,429,476 A | * | 2/1969 | Hunter ........................ 220/325 |
| 3,653,410 A | * | 4/1972 | West ............................ 138/89 |
| 4,178,967 A | * | 12/1979 | Streich ........................ 138/89 |
| 4,215,951 A | * | 8/1980 | Knox .......................... 405/203 |
| 4,262,702 A | * | 4/1981 | Streich ........................ 138/89 |
| 4,292,004 A | * | 9/1981 | Knox .......................... 405/203 |
| 4,412,559 A | * | 11/1983 | Streich et al. ................ 138/89 |
| 4,421,138 A | * | 12/1983 | Nickles ....................... 138/89 |
| 4,421,139 A | * | 12/1983 | Nickles ....................... 138/89 |
| 4,432,419 A | * | 2/1984 | Streich ........................ 166/188 |

* cited by examiner

Primary Examiner—Patrick Brinson
(74) Attorney, Agent, or Firm—Paul & Paul

(57) ABSTRACT

A self-locking, high-pressure stopper is disclosed. Also disclosed is a method of using the stopper. The stopper allows a branch pipe to be plugged from above ground using an elongated insertion tool. The self-locking stopper of the present invention includes a body having O-ring seals that is inserted into the branch pipe that is to be plugged. The self-locking stopper has outwardly biased locking tabs that are provided to engage a shoulder or step in the branching pipe in order to prevent the stopper from being pulled out, or pushed out by fluid pressure, once it is in place. The stopper system also includes a flanged insertion pipe used for inserting the stopper into the branch pipe. The stopper also has an adapter for engagement by an insertion tool that allows a user to insert the stopper from above ground.

34 Claims, 9 Drawing Sheets

2

SELF-LOCKING, HIGH PRESSURE SERVICE STOPPER

BACKGROUND OF THE INVENTION

1. Field of Invention

This invention relates generally to a stopper for closing off an unused branching pipe in a main fluid supply line.

2. Brief Description of the Related Art

In many applications the need arises to close or seal off an unused branching pipe or T-connection in a main fluid supply line. For example, when a building is to be demolished or a site modified in such a way that gas supply to the site is no longer required, the T-connection that branches off from the main gas line to supply the site has to be sealed off. Heretofore, an access well had to be dug to the branching pipe or the T-connection. The access well had to be large enough for a man to descend into to access and seal off branching pipe or the T-connection. This process is very time consuming and expensive, requiring a considerable amount of excavation. The need persists in the art for a device that allows branching pipes, T-connections and the like to be closed off through a relatively small hole drilled into the ground to reach the buried branching pipe, T-connection or the like.

SUMMARY OF THE INVENTION

The present invention is directed to a self locking stopper and method of its use that allows the stopper to be inserted into a branching pipe through a relatively small bore hole. The self-locking stopper of the present invention includes a body having O-ring seals that is inserted into the branch pipe that is to be plugged. The self-locking stopper has outwardly biased locking tabs that are provided to engage a shoulder or step in the branching pipe in order to prevent the stopper from being pulled out, or pushed out by fluid pressure, once it is in place. The stopper system also includes a flanged insertion pipe used for inserting the stopper into the branch pipe. The stopper also has an adapter for engagement by an insertion tool that allows a user to insert the stopper from above ground.

BRIEF DESCRIPTION OF THE DRAWINGS

Like reference numerals indicate like elements throughout the several views.

DETAILED DESCRIPTION OF THE INVENTION

Referring to FIGS. 1–9, an illustrative example of a self-locking, high-pressure stopper and stopper system according to the present invention can be seen. The self-locking, high-pressure stopper system 100 of FIGS. 1–9 includes an insertion tube 102 and a self-locking, high-pressure stopper 104. In the illustrated example of FIG. 1 the stopper system 100 is shown plugging off a pipe "TEE" 106 that is branching off from a gas pipe or main 108.

Figure 2:
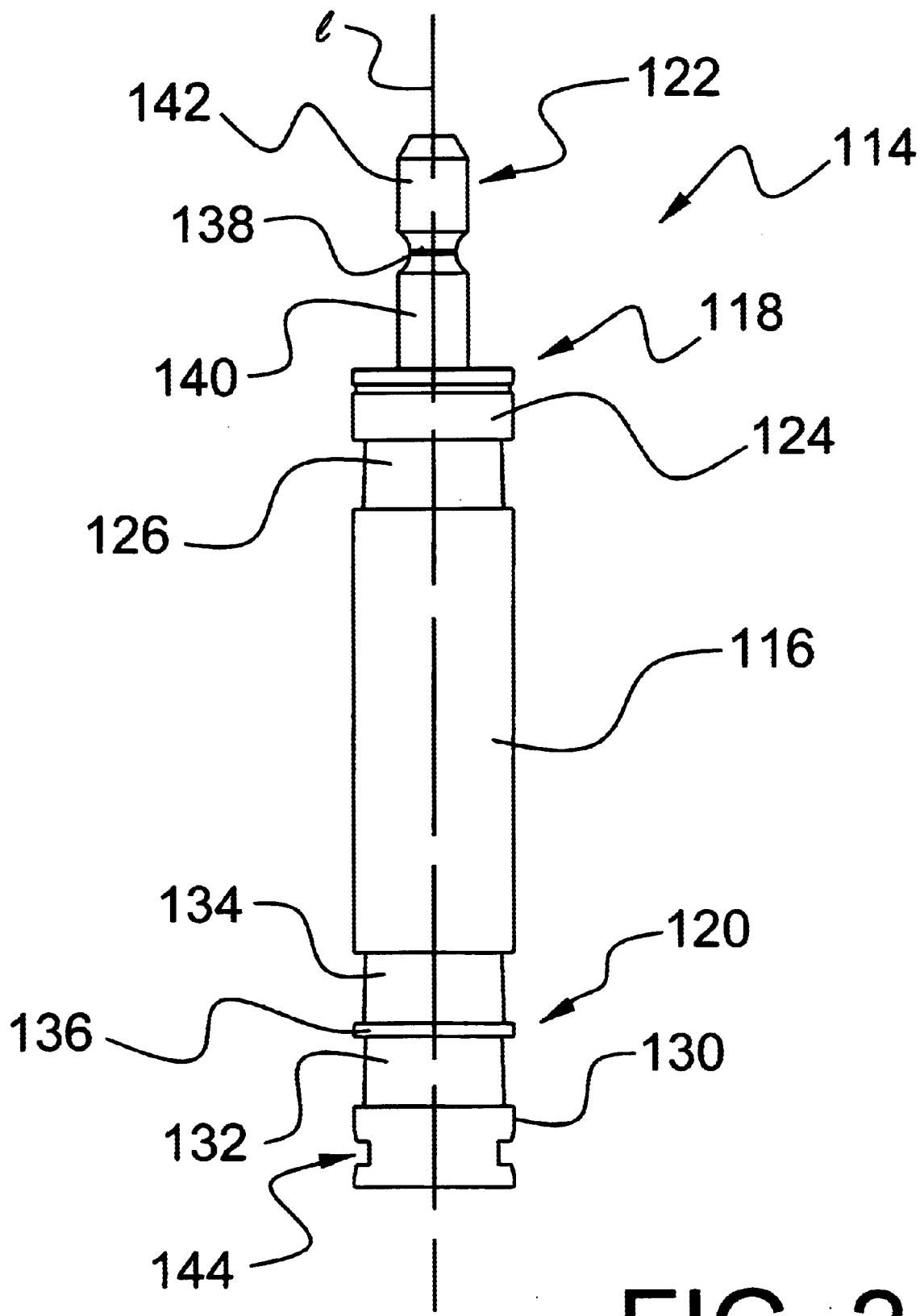
FIG. 2 is a right side view in elevation of the plug body of the self-locking, high-pressure stopper according to the present invention.
Figure 3:
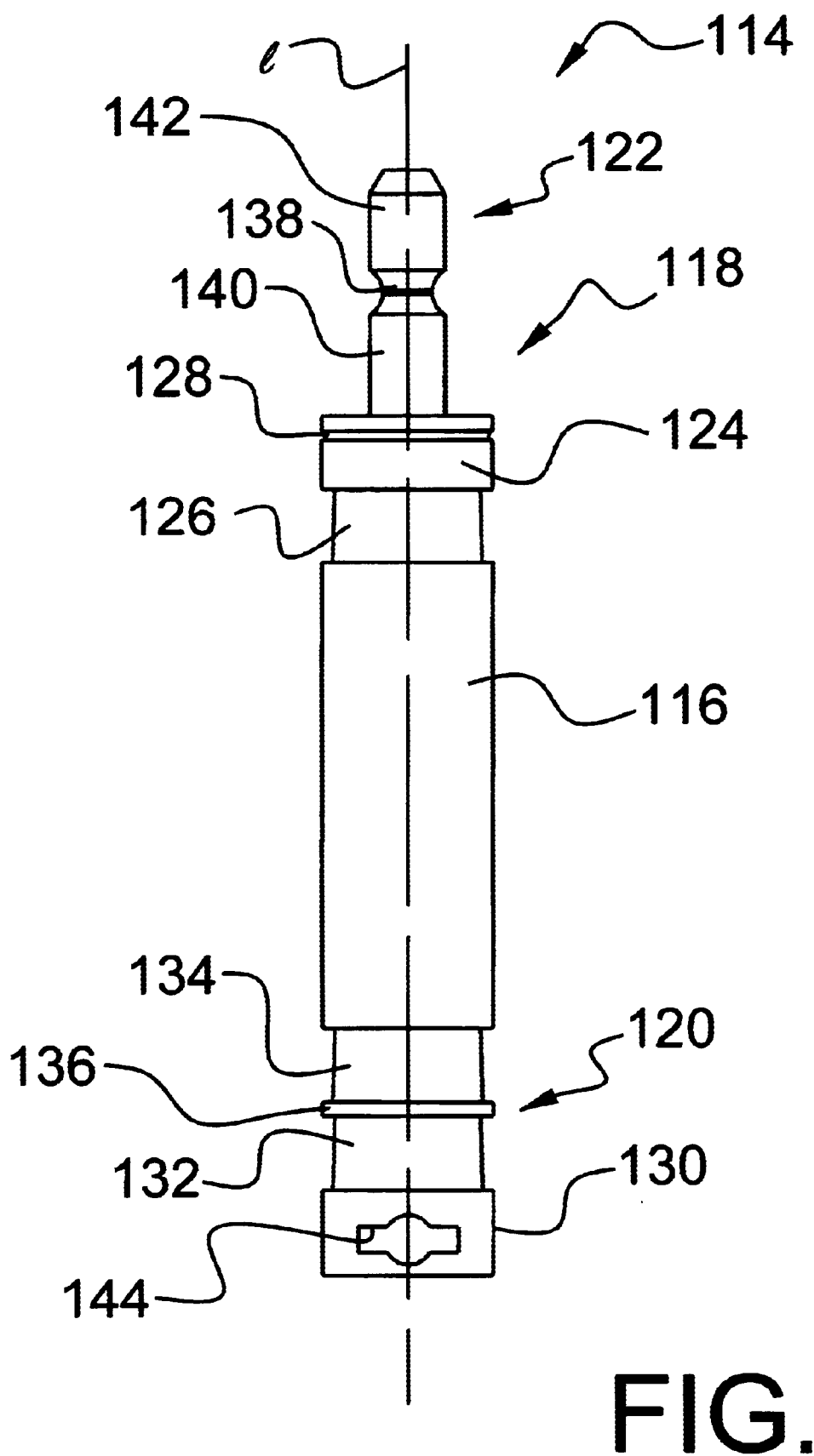
FIG. 3 is a front view in elevation of the plug body of the self-locking, high-pressure stopper according to the present invention.
Figure 4:
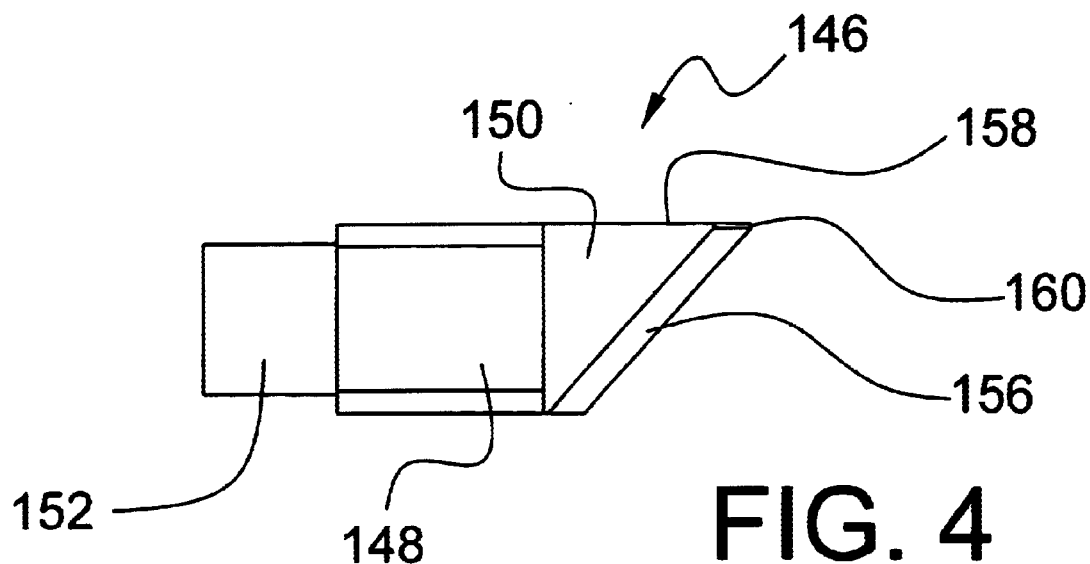
FIG. 4 is a right side view in elevation of the locking tab of the self-locking, high-pressure stopper according to the present invention.
Figure 5:
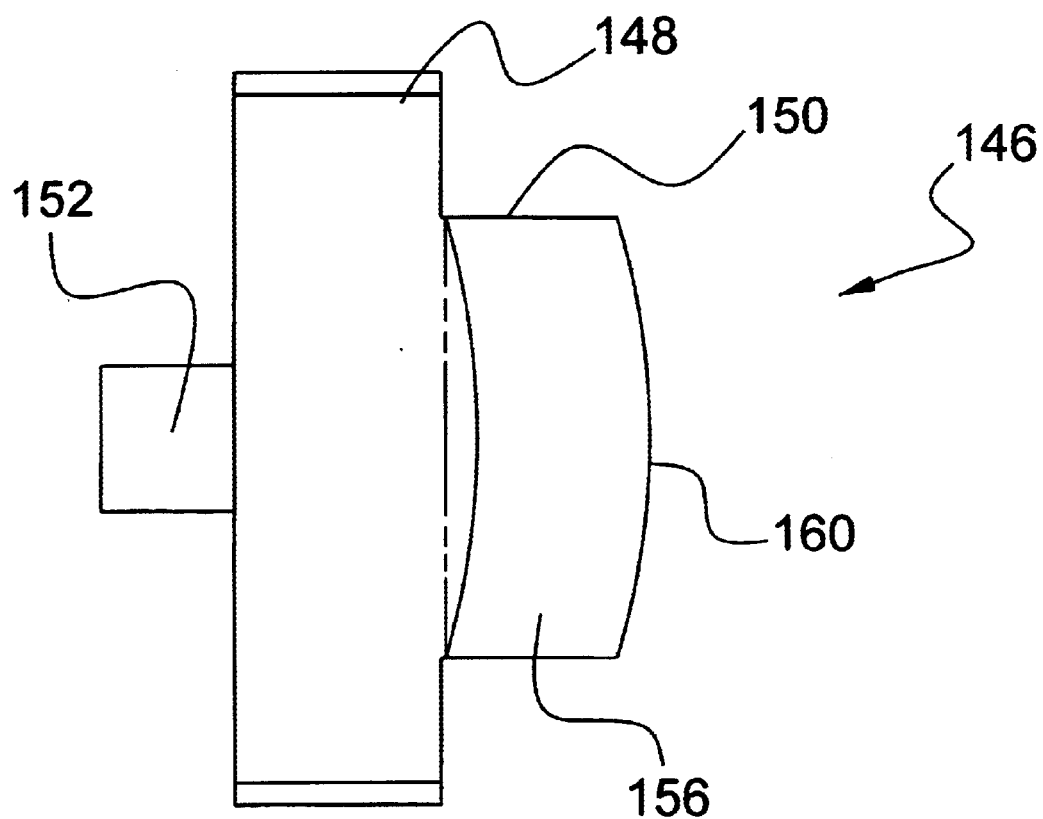
FIG. 5 is a bottom view of the locking tab of the self-locking, high-pressure stopper according to the present invention.
Figure 6:
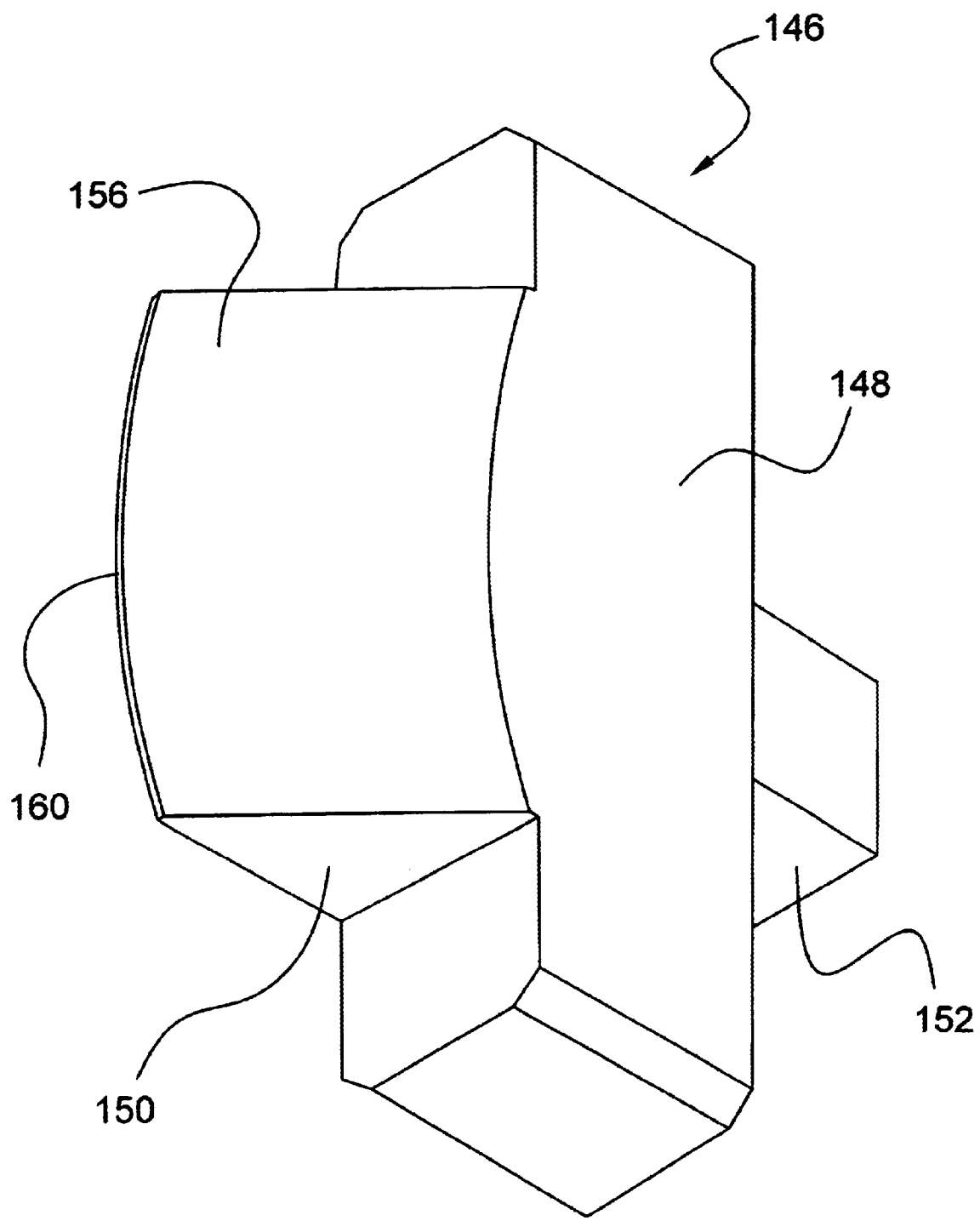
FIG. 6 is an isometric view of the locking tab of the self-locking, high-pressure stopper according to the present invention.
Figure 7:
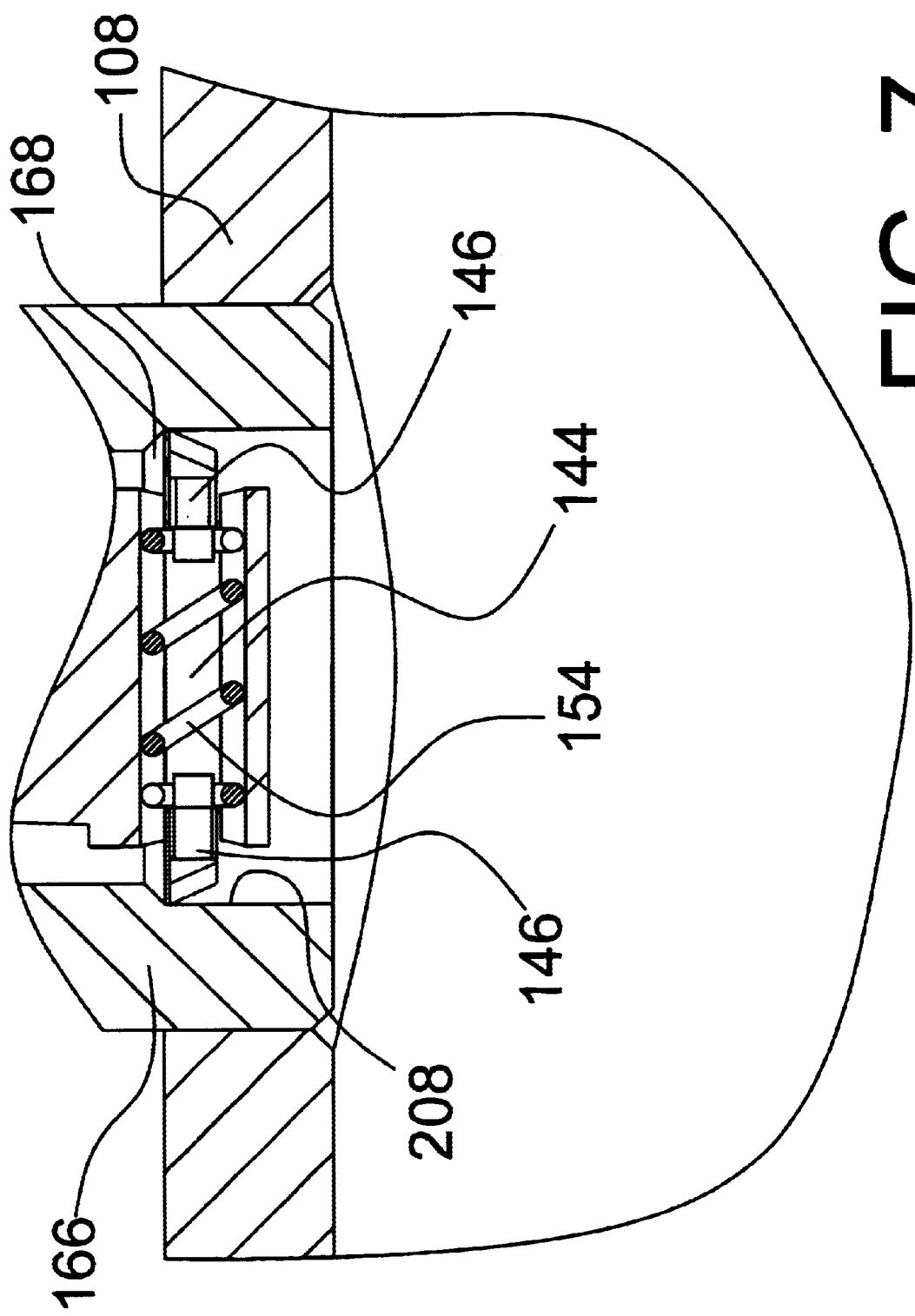
FIG. 7 is a fragmentary, cross sectional view showing the locking tabs and the plug body, of the self-locking, high-pressure stopper according to the present invention, installed in a pipe "TEE".
Figure 8:
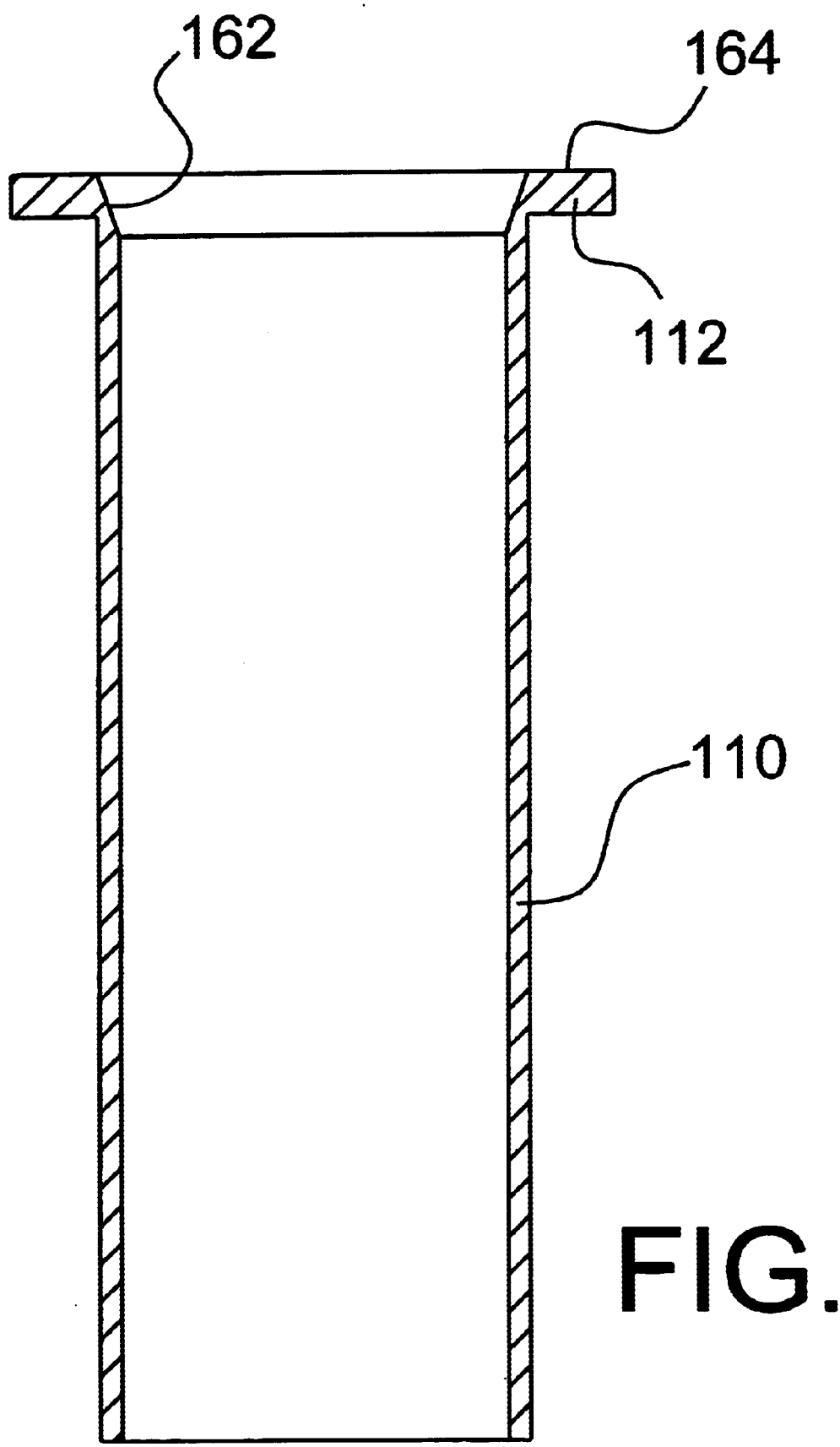
FIG. 8 is a cross sectional view of the insertion tube of the self-locking, high-pressure stopper according to the present invention.
Figure 9:
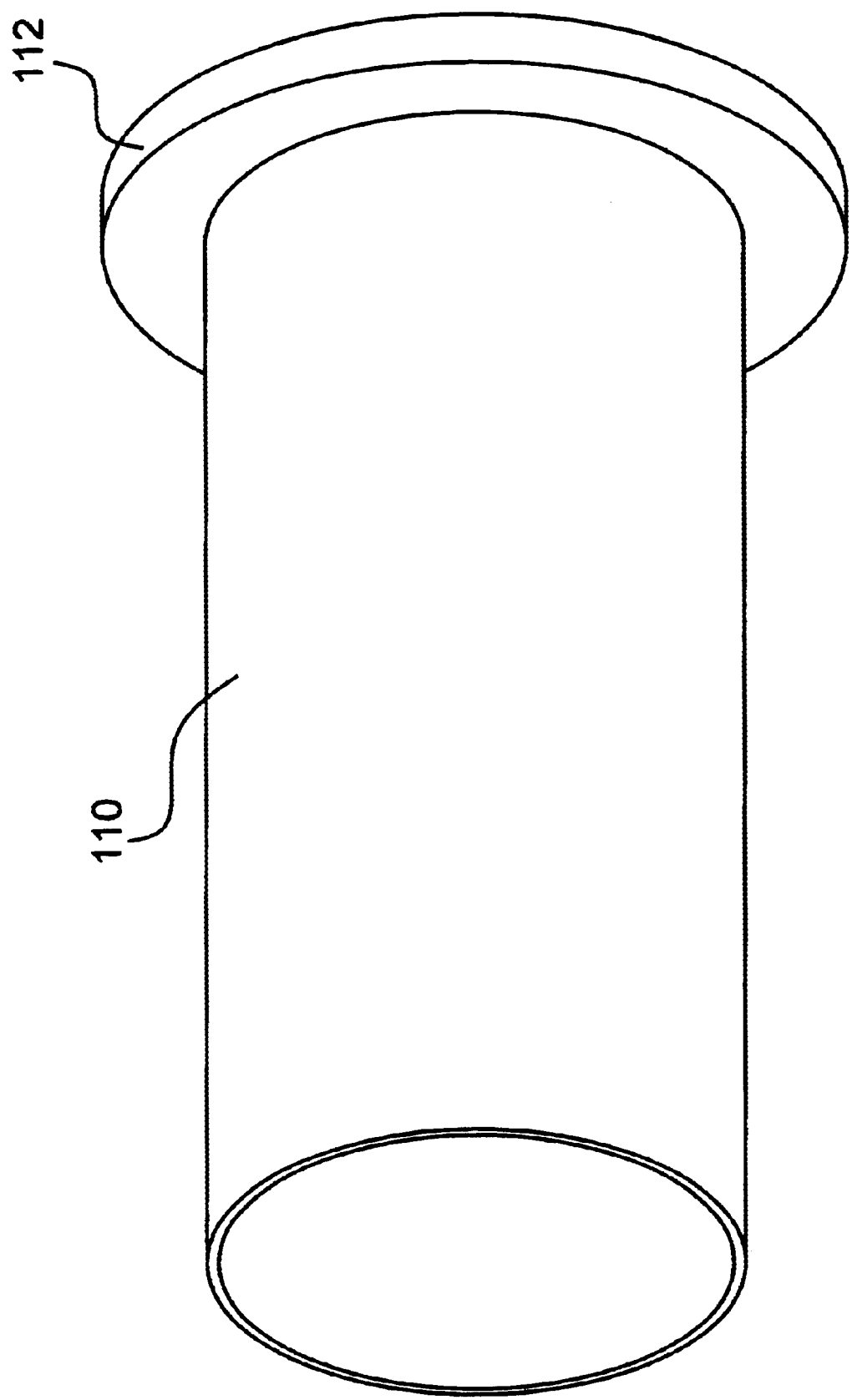
FIG. 9 is an isometric view of the insertion tube of the self-locking, high-pressure stopper according to the present invention.

The insertion tube 102 comprises a tubular portion 110 having an annular flange 112 at a first end thereof. The stopper 104 comprises a stopper body 114 having a middle portion 116, a first end portion 118, and a second end portion 120. The middle portion 116 is positioned intermediate the first end portion 118 and the second end portion 120. The middle portion 116 can be substantially cylindrical as best illustrated in FIGS. 2 and 3. The first end portion 118 is provided with an insertion tool engagement portion 122. Also, the first end portion 118 is provided with a large diameter portion 124 and a tapering diameter portion 126 in tandem, with the large diameter portion 124 being positioned intermediate the tool engagement portion 122 and the tapering diameter portion 126. The large diameter portion 124 has a snap-ring groove 128. The tapering diameter portion 126 has a diameter that uniformly tapers or decreases from a large diameter at one end to a small diameter at the other end in the direction of the longitudinal axis l of the stopper body 114. The small diameter end of the tapering diameter portion 126 is positioned adjacent the large diameter portion 124, while the large diameter end of the tapering diameter portion 126 is positioned adjacent the middle portion 116. The diameter of the small diameter end of the tapering diameter portion 126 is smaller that the diameter of the large diameter portion 124.

The second end portion 120 is provided with a locking tab housing portion 130, a pair of tapering diameter portions 132 and 134, and a large diameter portion 136. The tapering diameter portions 132 and 134 each have a diameter that uniformly tapers or decreases from a large diameter at one end to a small diameter at the other end in the direction of the longitudinal axis l of the stopper body 114. The small diameter end of the tapering diameter portion 134 is positioned adjacent the middle portion 116. The large diameter portion 136 is positioned intermediate the tapering diameter portion 132 and the tapering diameter portion 134. The large diameter end of the tapering diameter portion 134 is positioned adjacent the large diameter portion 136. The small diameter end of the tapering diameter portion 132 is positioned adjacent the large diameter portion 136, and the large diameter end of the tapering diameter portion 132 is positioned adjacent the locking tab housing portion 130. The small diameter end of the tapering diameter portion 134 is smaller in diameter than the middle portion 116. The small diameter end of the tapering diameter portion 132 is smaller in diameter than the large diameter portion 136.

The insertion tool engagement portion 122 is in the form of a rod having a narrowing waist portion 138 located intermediate two large diameter portions 140 and 142. Each of the two large diameter portions 140 and 142 is of substantially uniform diameter throughout its length. In the illustrated embodiment, the two large diameter portions 140 and 142 are substantially of the same diameter. In the illustrated embodiment, the waist portion 138 has a minimum diameter at about its center. The diameter of the waist portion 138 increases from its minimum value with decreasing distance from either one of the two large diameter portions 140 and 142.

In the illustrated embodiment, the large diameter portion 136, the middle portion 116, the locking tab housing portion 130, and the large diameter portion 124 are of substantially the same diameter. The locking tab housing portion 130 has a passage 144 that extends through the locking tab housing portion 130 in a direction substantially transverse or perpendicular to the longitudinal axis of the stopper body 114. The passage 144 houses at least a portion of each of the two locking tabs 146. The passage 144 has a cross section that resembles the union of a rectangle with a circle, with the center of the circle positioned at the intersection of the diagonals of the rectangle and with the length of the rectangle being larger than the diameter of the circle.

The two locking tabs 146 are each in the form of a body 148 having a beveled projection 150 on one side and a cuboid projection 152 on the other side. The tab body 148 is approximately in the shape of a rectangular parallelepiped having its shorter edges beveled. The tab body 148 is dimensioned to bear against the portions of the passage 144 that follow a rectangular contour when viewed in cross section and to slidably support the locking tab 146 within the passage 144. In addition, each end of the spring 154 bears against a respective one of the tab bodies 148 and the cuboid projection 152 of each of the locking tabs 146 extends through at least one of the coils of the spring 154 when the stopper 104 is fully assembled. The beveled projection 150 has a chisel-like profile created by a beveled surface 156 and a substantially flat surface 158. The distal edge 160 of the beveled projection 150 and the beveled surface 156 may be arcuate so as to follow the inner surface of the pipe "TEE" 106.

The tubular portion 110 of the insertion tube 102 is open at both ends. The insertion tube 102 has a chamfered surface 162 extending between the inner surface of the tubular portion 110 and the surface 164 of the annular flange 112 that surrounds the opening at the first end of the tubular portion 110. The chamfered surface 162 forms a funnel that eases the insertion of the end of the stopper 104, having the outwardly biased locking tabs 146 installed therein, into the insertion tube 102.

The locking tabs 146 are outwardly biased relative to the passage 144 by some type of biasing means. In the illustrated example, the locking tabs 146 are outwardly biased by a coil spring 154 positioned within the passage 144.

Figure 1:
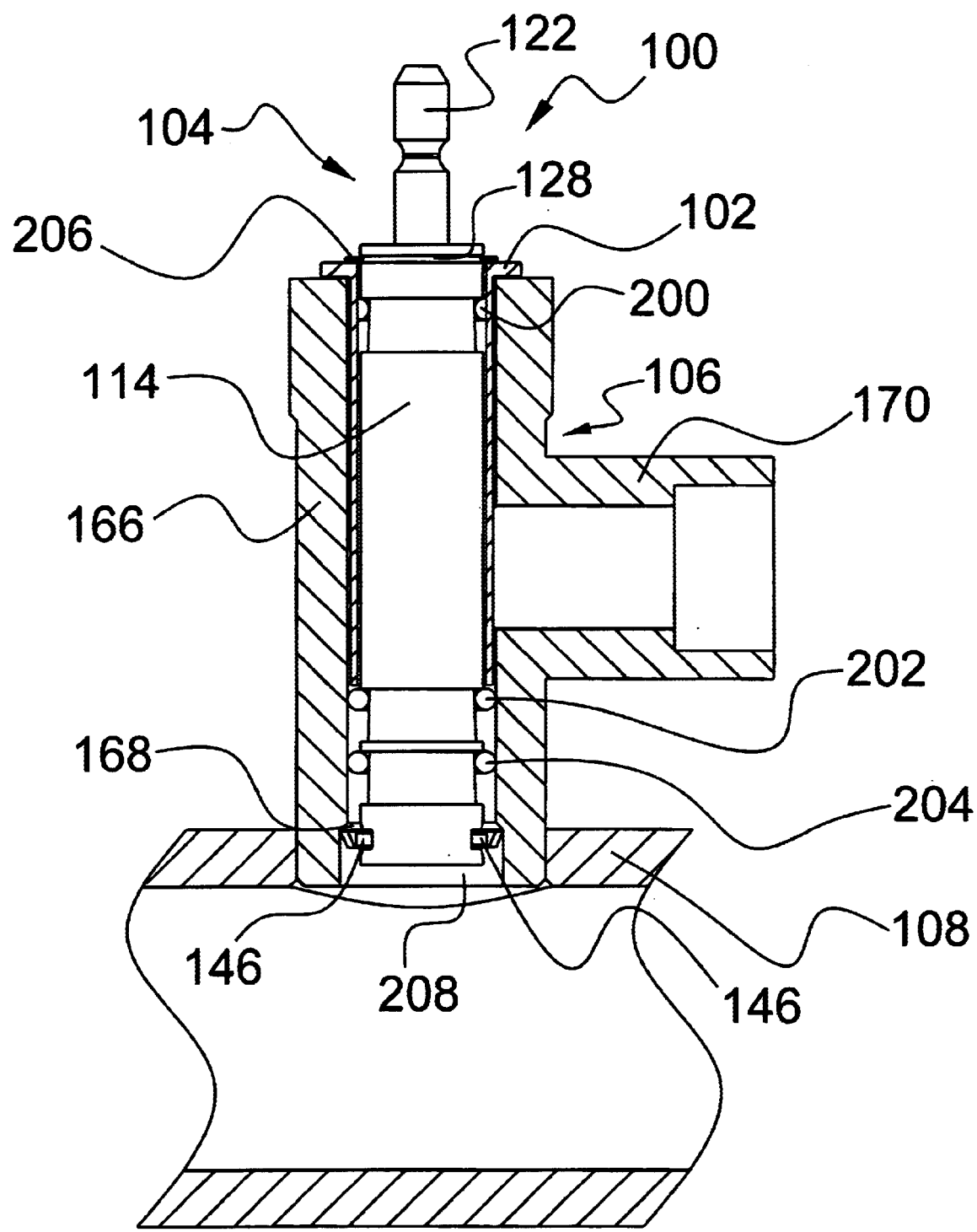
FIG. 1 is an environmental view showing the self-locking, high-pressure stopper according to the present invention installed in a T-connection.

In the illustrated example of FIG. 1, the main tubular portion 166 of the pipe "TEE" 106 has an annular recess or shoulder 168. A branching portion 170 branches off the main tubular portion 166. The locking tabs 146 engage the annular shoulder 168 to keep the stopper system 100 from being pulled or pushed out of the pipe "TEE" 106.

The stopper 104 further includes o-rings 200, 202, and 204 and a snap ring 206. The o-rings 200, 202, and 204 are placed around the tapering diameter portions 126, 132, and 134, respectively. The snap ring 206 is received in part in the groove 128.

Figure 10:
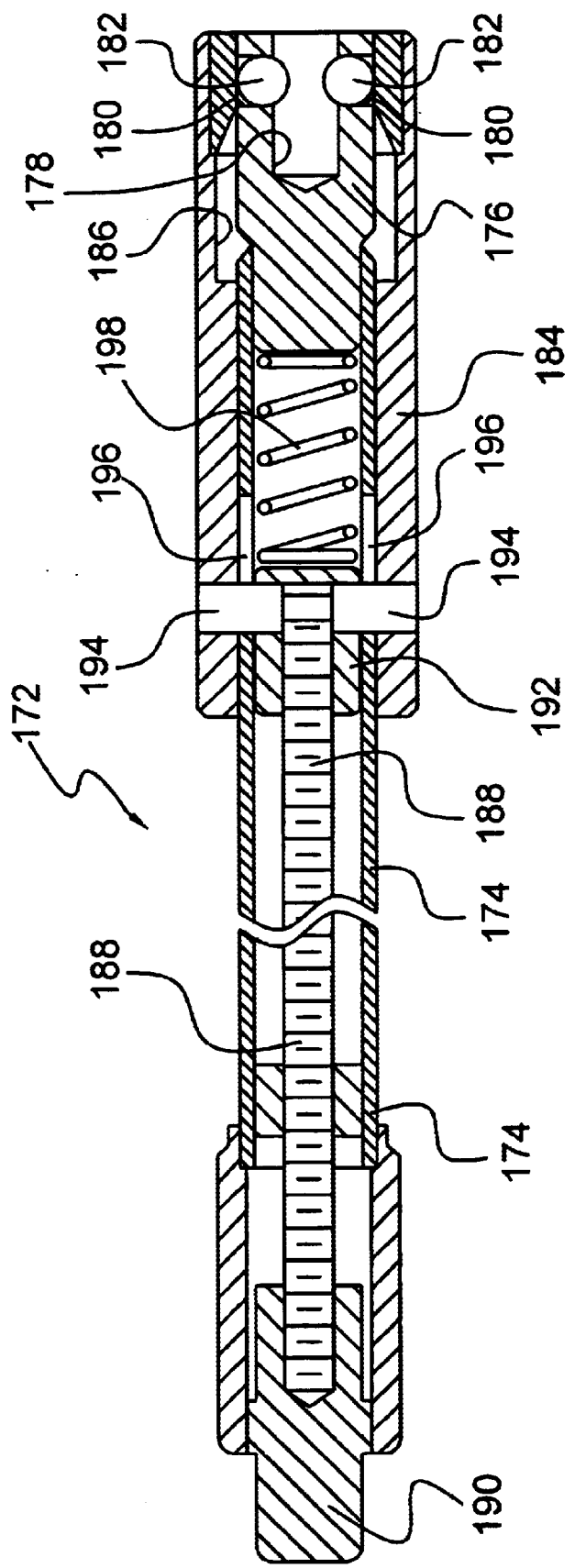
FIG. 10 is a cross sectional view of the insertion tool for use with the self-locking, high-pressure stopper according to the present invention.

Referring to FIG. 10, the insertion tool 172 for inserting the stopper system 100 can be seen. The insertion tool 172 includes an elongated tube 174 having a socket 176 fixed to on end thereof. The cavity 178 of the socket 176 is sized to receive at least a portion of the insertion tool engagement portion 122 that includes the waist portion 138. The socket 176 has passages 180 that house at least a part of the balls 182. The passages 180 open to the interior of the cavity 178 to allow a portion of the balls 182 to project into the bore of the cavity 178. The passages 180 are also open to the exterior of the socket 176. The diameter of the openings of the passages 180 to the bore of the cavity 178 is less than the diameter of the balls 182. A sleeve assembly 184 surrounds one end of the tube 174 and the socket 176. The sleeve assembly 184 has an annular cavity 186. An elongated threaded rod 188 is movably housed within the tube 174. One end of the rod 188 is engaged to a push button 190. The other end of the rod 188 is engaged to a plug 192. The plug 192 has a pair of rods 194 projecting laterally from either side thereof. The rods 194 pass through elongated slots 196 and engage the sleeve assembly 184 such that the sleeve assembly 184 moves in response to movement of the button 190. A spring 198 is provided intermediate the plug 192 and the socket 176. The spring 198 biases the plug 192, the rods 194, the rod 188, the button 190, and the sleeve assembly 184 toward the engaged position shown in FIG. 10.

With the insertion tool engagement portion 122 positioned in the socket 176 such that the waist portion 138 registers with the passages 180 and with the sleeve assembly 184 in the engaged position, the balls 182 engage the waist portion 138 such that the stopper 104 is securely held by the insertion tool 172. With the sleeve assembly 184 in the engaged position, portions of the sleeve assembly block off the opening of the passages 180 to the exterior of the socket 176 such that the balls 182 remain in a position where a portion of the balls 182 projects into the bore of the cavity 178 and remains in engagement with the waist portion 138 of the insertion tool engagement portion 122. To release the stopper 104, the button 190 is pushed inward relative to the tube 174. As the button 190 is pushed inward, the sleeve assembly 184 moves relative to the socket 176 such that the cavity 186 is at least partly brought into registry with the passages 180. The balls 182 can then move out of the bore of the cavity 178 to thereby allow the stopper 104 to be released.

In use, the locking tabs 146 are placed in the passage 144 with the spring 154 between them. The locking tabs 146 are then simultaneously pressed into the passage 144 to minimize the projection of the locking tabs 146 from the stopper body 114. The end portion 120 is then inserted into the insertion tube 102 through the end having the flange 112. In this configuration the insertion tube 102 prevents the locking tabs 146 from falling out of the passage 144 and the o-rings 202 and 204 frictionally hold the insertion tube 102 in place relative to the stopper body 114. The stopper system 100 is then secured to the end of the insertion tool 172 as previously explained above. Using the insertion tool 172 the stopper system 100 is lowered to the pipe "TEE" 106 and inserted into the main pipe portion 166 of the pipe "TEE" 106. The flange 112 limits the movement of the insertion tube 102 relative to the pipe "TEE" 106. Further insertion of the stopper 104 into the main pipe portion 166 of the pipe "TEE" 106 causes the stopper 104 to move relative to the insertion tube 102 until the snap ring 206 abuts the flange 112. At this time the snap ring 206 limits the further insertion of the stopper 104 into the main pipe portion 166 of the pipe "TEE" 106. In the mean time, the locking tabs 146 extend outward into the larger diameter lower end portion 208 of the main pipe portion 166 of the pipe "TEE" 106 to engage the shoulder 168 and secure the stopper 104 within the main pipe portion 166 of the pipe "TEE" 106. The insertion tool 172 is then disengaged from the stopper 104 by pressing in the button 190 and lifting the insertion tool 172 away from the stopper 104. The pipe "TEE" 106 is now plugged off.

With the snap ring 206 abutting the flange 112 as shown in FIG. 1, the o-rings 202 and 204 clear the insertion tube 102 and seal any gaps between the stopper body 114 and the interior surface of the main pipe portion 166 of the pipe "TEE" 106. The o-ring 200 centers and laterally supports the stopper body 114 within the insertion tube 102. The tapered configuration of the portions 126, 132, and 134 cause the o-rings 200, 204, and 202 to be even more strongly wedged between the stopper body 114 and the interior surface of the main pipe portion 166 of the pipe "TEE" 106, if any attempt is made to pull out the stopper 104.

With the stopper system 100 in place, the pipe "TEE" 106 is then sawed completely through just below the branching pipe 170. External threads are then cut on the exterior of the remaining portion of the main pipe portion 166 of the pipe "TEE" 106. A threaded cap is then applied to the remaining portion of the main pipe portion 166 of the pipe "TEE" 106, with the portion 120 of the stopper body, the o-rings 202 and 204, the spring 154, and the locking tabs 146 remaining in place, to complete the capping of the pipe "TEE" 106.

It is to be understood that the present invention is not limited to the embodiments described above, but includes any and all embodiments within the scope of the appended claims. Furthermore, it is to be understood that the embodiments of the present invention disclosed above are susceptible to various modifications, changes and adaptations by those skilled in the art, without departing from the spirit and scope of the invention.

What is claimed is:

1. A stopper system for plugging a pipe, the stopper system comprising:
    a stopper body having a first end portion adapted for engagement by an insertion tool and a second end portion;
    a first o-ring surrounding a portion of said stopper body intermediate said first end portion and said second end portion;
    a second o-ring surrounding a portion of said stopper body intermediate said first end portion and said first o-ring, said second o-ring being spaced apart from said first o-ring to allow said stopper body to be sawed through intermediate said first o-ring and said second o-ring; and
    at least one locking tab housed at least in part within said second end portion of said stopper body, said at least one locking tab being adapted to engage a shoulder within the pipe to be plugged to thereby secure the stopper system in place within the pipe to be plugged.

2. The stopper system according to claim 1, further comprising biasing means for biasing said locking tab to project outward from said second end portion of said stopper body.

3. The stopper system according to claim 2, wherein said second end portion of said stopper body has a passage therein and said locking tab is received at least in part in said passage.

4. The stopper system according to claim 3, wherein said locking tab is a first locking tab, the stopper system further comprises a second locking tab, and said second locking tab is received at least in part in said passage.

5. The stopper system according to claim 4, wherein said biasing means is positioned intermediate said first locking tab and said second locking tab.

6. The stopper system according to claim 5, further comprising a third o-ring positioned intermediate said first o-ring and said second end portion of said stopper body.

7. The stopper system according to claim 5, wherein said stopper body has a snap-ring groove intermediate said second o-ring and said first end portion of said stopper body and the stopper system further comprises a snap ring received in part within said snap-ring groove.

8. The stopper system according to claim 7, further comprising a third o-ring positioned intermediate said first o-ring and said second end portion of said stopper body.

9. The stopper system according to claim 8, wherein said stopper body has first, second and third tapering diameter portions, said first, second and third tapering diameter portions are located intermediate said snap-ring groove and said passage in said second end portion of said stopper body, said first, second and third o-rings surrounding said stopper body along said first, second and third tapering diameter portions, respectively, said second tapering diameter portion is positioned intermediate said first tapering diameter portion and said snap-ring groove, said first tapering diameter portion is positioned intermediate said second tapering diameter portion and said third tapering diameter portion, and said third tapering diameter portion is positioned intermediate said first tapering diameter portion and said passage in said second end portion of said stopper body.

10. The stopper system according to claim 9, wherein said first end portion of said stopper body comprises a narrowing waist portion positioned intermediate first and second large diameter portions.

11. The stopper system according to claim 10, further comprising:
    an insertion tube comprising a tubular portion having a first and a second end and an annular flange positioned at said first end of said tubular portion.

12. The stopper system according to claim 11, wherein said insertion tube has a chamfered surface at said first end of said tubular portion.

13. The stopper system according to claim 1, further comprising:
    an insertion tube comprising a tubular portion having a first and a second end and an annular flange positioned at said first end of said tubular portion.

14. The stopper system according to claim 13, wherein said insertion tube has a chamfered surface at said first end of said tubular portion.

15. A method of plugging a pipe, comprising the steps of:
    providing an insertion tool;
    providing a stopper system for plugging the pipe, the stopper system comprising:
        a stopper body having a first end portion adapted for engagement by an insertion tool and a second end portion;
        at least one o-ring surrounding a portion of said stopper body intermediate said first end portion and said second end portion;
        at least one locking tab housed at least in part within said second end portion of said stopper body, said at least one locking tab being adapted to engage a shoulder within the pipe to be plugged to thereby secure the stopper system in place within the pipe to be plugged; and an insertion tube comprising a tubular portion having a first and a second end and an annular flange positioned at said first end of said tubular portion;

securing the stopper system to the insertion tool;

inserting the stopper system into the pipe to be plugged until said at least one locking tab engages the shoulder within the pipe to be plugged to thereby secure the stopper system in place within the pipe to be plugged; and disengaging the insertion tool from the stopper system.

16. The method according to claim 15, further comprising the steps of:

cutting the pipe intermediate the o-ring and the first end portion of the stopper body;

threading the exterior of the pipe; and applying a threaded cap to the pipe.

17. A method of plugging a pipe, comprising the steps of:

providing an insertion tool;

providing a stopper system for plugging the pipe, the stopper system comprising:

a stopper body having a first end portion adapted for engagement by an insertion tool and a second end portion;

a first o-ring surrounding a portion of said stopper body intermediate said first end portion and said second end portion;

a second o-ring surrounding a portion of said stopper body intermediate said first end portion and said first o-ring, said second o-ring being spaced apart from said first o-ring to allow said stopper body to be sawed through intermediate said first o-ring and said second o-ring; and at least one locking tab housed at least in part within said second end portion of said stopper body, said at least one locking tab being adapted to engage a shoulder within the pipe to be plugged to thereby secure the stopper system in place within the pipe to be plugged;

securing the stopper system to the insertion tool;

inserting the stopper system into the pipe to be plugged until said at least one locking tab engages the shoulder within the pipe to be plugged to thereby secure the stopper system in place within the pipe to be plugged; and disengaging the insertion tool from the stopper system.

18. The method according to claim 17, further comprising the steps of:

cutting the pipe intermediate the first o-ring and the second o-ring;

threading the exterior of the pipe; and applying a threaded cap to the pipe.

19. A stopper system for plugging a pipe, the stopper system comprising:

a stopper body having a first end portion adapted for engagement by an insertion tool and a second end portion;

at least one o-ring surrounding a portion of said stopper body intermediate said first end portion and said second end portion;

at least one locking tab housed at least in part within said second end portion of said stopper body, said at least one locking tab being adapted to engage a shoulder within the pipe to be plugged to thereby secure the stopper system in place within the pipe to be plugged; and an insertion tube comprising a tubular portion having a first and a second end and an annular flange positioned at said first end of said tubular portion, the insertion tube retaining said at least one locking tab in said second end portion of said stopper body during insertion of the stopper system into the pipe to be plugged.

20. The stopper system according to claim 19, wherein said insertion tube has a chamfered surface at said first end of said tubular portion.

21. The stopper system according to claim 19, further comprising biasing means for biasing said locking tab to project outward from said second end portion of said stopper body.

22. The stopper system according to claim 21, wherein said second end portion of said stopper body has a passage therein and said locking tab is received at least in part in said passage.

23. The stopper system according to claim 22, wherein said locking tab is a first locking tab, the stopper system further comprises a second locking tab, and said second locking tab is received at least in part in said passage.

24. The stopper system according to claim 23, wherein said biasing means is positioned intermediate said first locking tab and said second locking tab.

25. The stopper system according to claim 24, wherein said at least one o-ring is a first o-ring and the stopper system further comprises second and third o-rings, said second o-ring being positioned intermediate said first o-ring and said first end portion of said stopper body, and said third o-ring being positioned intermediate said first o-ring and said second end portion of said stopper body.

26. The stopper system according to claim 24, wherein said stopper body has a snap-ring groove intermediate said at least one o-ring and said first end portion of said stopper body and the stopper system further comprises a snap ring received in part within said snap-ring groove.

27. The stopper system according to claim 26, wherein said at least one o-ring is a first o-ring and the stopper system further comprises second and third o-rings, said second o-ring being positioned intermediate said first o-ring and said snap-ring groove, and said third o-ring being positioned intermediate said first o-ring and said passage in said second end portion of said stopper body.

28. The stopper system according to claim 27, wherein said stopper body has first, second and third tapering diameter portions, said first, second and third tapering diameter portions are located intermediate said snap-ring groove and said passage in said second end portion of said stopper body, said first, second and third o-rings surrounding said stopper body along said first, second and third tapering diameter portions, respectively, said second tapering diameter portion is positioned intermediate said first tapering diameter portion and said snap-ring groove, said first tapering diameter portion is positioned intermediate said second tapering diameter portion and said third tapering diameter portion, said third tapering diameter portion is positioned intermediate said first tapering diameter portion and said passage in said second end portion of said stopper body.

29. The stopper system according to claim 28, wherein said first end portion of said stopper body comprises a narrowing waist portion positioned intermediate first and second large diameter portions.

30. A stopper system for plugging a pipe, the stopper system comprising:
- a stopper body having a first end portion adapted for engagement by an insertion tool and a second end portion, wherein said first end portion of said stopper body comprises a narrowing waist portion positioned intermediate first and second large diameter portions;
- at least one o-ring surrounding a portion of said stopper body intermediate said first end portion and said second end portion; and
- at least one locking tab housed at least in part within said second end portion of said stopper body, said at least one locking tab being adapted to engage a shoulder within the pipe to be plugged to thereby secure the stopper system in place within the pipe to be plugged.

31. The stopper system according to claim 30, further comprising biasing means for biasing said locking tab to project outward from said second end portion of said stopper body.

32. The stopper system according to claim 31, wherein said second end portion of said stopper body has a passage therein and said locking tab is received at least in part in said passage.

33. The stopper system according to claim 32, wherein said locking tab is a first locking tab, the stopper system further comprises a second locking tab, and said second locking tab is received at least in part in said passage.

34. The stopper system according to claim 33, wherein said biasing means is positioned intermediate said first locking tab and said second locking tab.

\* \* \* \* \*